Patented July 28, 1942

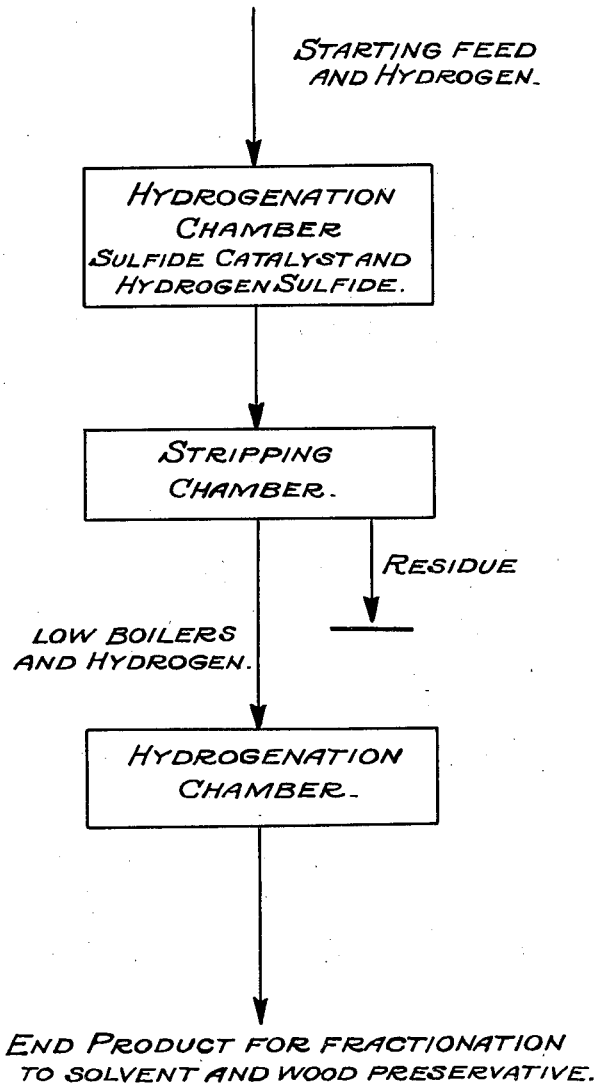

2,291,299

UNITED STATES PATENT OFFICE 2,291,299

PRODUCING SOLVENTS AND WOOD PRESERVATIVES

Jacquelin E. Harvey, Jr., Atlanta, Ga., assignor of one-half to Southern Wood Preserving Company, East Point, Ga., a corporation of Georgia Application August 14, 1940, Serial No. 352,660

1 Claim. (Cl. 196—53)

The present invention relates to the joint induction of useful characteristics.

More specifically, the present invention relates to the joint production of solvents and wood preservatives from hydrocarbons.

An object of the present invention is the joint production of solvents and wood preservatives from tars of aromatic content and fractions thereof.

Another object of the present invention is the joint production of solvents and wood preservatives from tars of aromatic content and fractions thereof under conditions that induce no substantial percentage of liquid fractions of low solvency or low toxicity, or, stated in another manner, under conditions so controlled as to induce no substantial percentage of liquid chain structures.

Another object of the present invention is the joint production of solvents and wood preservatives of superior solvency and added toxicity under conditions that induce no substantial percentage of carbon deposit.

Yet another object of the present invention is the subjection of the starting materials to the step-wise action of hydrogen, at least one cycle of which is maintained at optimum conditions by providing a hydrogen sulfide atmosphere, whereby to enhance the induction of solvency and toxicity.

Other objects of the present invention will become apparent from the following disclosures.

The following examples will serve to illustrate modes of practicing the present invention.

The invention will be understood from the following description of illustrative steps comprising various methods of securing the objects of the invention, when read in connection with the accompanying drawing wherein the figure is a diagrammatic sketch of an apparatus for carrying out a form of the process of the invention and wherein the nature of the step carried out in each chamber and the contents thereof are indicated by legend.

*Example 1.*—A coal tar creosote, specific gravity 1.08 coke residue substantially 2% and having substantially 35% residue above 355° C. is passed through a high pressure reaction vessel while simultaneously flowing hydrogen and hydrogen sulfide therewith while contacting a molybdenum sulfide catalyst at a temperature of 410° C. and 200 atmospheres pressure; hydrogen sulfide partial pressure one atmosphere. The gas flow is 12,000 cubic feet per barrel creosote and the time of contact is 45 minutes. The beneficiated creosote is inspected and found to have a reduced coke residue, specific gravity and viscosity; no substantial percentage of liquid chain structures will be induced, nor will there be any appreciable deposition of carbonaceous increment in the reaction chamber. The beneficiated creosote is distilled to an upper limit of 370° C. and the distillate subjected to the action of hydrogen and hydrogen sulfide while contacting a sulfide catalyst at 200 atmospheres pressure and 450° C.; hydrogen sulfide partial pressure one atmosphere; time of contact three minutes. The beneficiated material is characterized by induced solvent properties and toxic increment and is further characterized by a final increment of low boiling fractions in excess of fractional increment in the higher boiling range. The finally beneficiated material is distilled up to 200° C. to provide the distillate as a solvent of superior solvency and the remainder thereof as a wood preservative of enhanced toxic properties.

By the term "enhanced solvency" and "superior solvency" is meant among other things that the solvent or solvents so described are superior in solvency to solvents currently on the market; by the term "added toxicity" or "enhanced toxicity" is meant that the wood preservatives so described have a toxicity in excess of their parent material.

The solvents of the present invention may be fractionated as desired whereby to provide solvents and/or plasticizers of varying characteristics.

The point of fractionation between the solvent and wood preservative is not inflexible, inasmuch as commercial solvents currently on the market have varied end points and wood preservatives of current usage have varied initial boiling points. Thus, inasmuch as the end point of the solvent of the present invention substantially corresponds to the initial boiling point of the wood preservative, it will be immediately obvious that the point of fractionation is not inflexible, but may be varied at will.

In the tabular data shown below are solvents and wood preservatives of accepted specifications, their end point and initial boiling point, respectively:

*Solvents*

| Identification: | End point, °C. |
|---|---|
| Benzol | 120 |
| Toluol | 150 |
| High flash naphtha | 200 |
| Heavy naphtha | Above 200 |

*Wood preservatives—Specifications*

1. A. W. P. A.:
    a. Up to 210° C., not more than 5%
    b. Up to 235° C., not more than 25%
2. A. W. P. A.:
    a. Up to 210° C., not more than 1%
    b. Up to 235° C., not more than 10%
    c. Up to 355° C., not less than 65%
3. A. W. P. A.:
    a. Up to 235° C., not more than 1½%
    b. Up to 300° C., not more than 16½%
    c. Up to 355° C., not less than 45%
4. A. W. P. A.:
    a. Up to 210° C., not more than 8%
    b. Up to 235° C., not more than 35%
5. A. W. P. A.:
    a. Up to 210° C., not more than 10%
    b. Up to 235° C., not more than 40%
6. A. W. P. A.:
    a. Up to 210° C., not more than 5%
    b. Up to 235° C., not more than 15%
7. Prussian Ry.:
    a. Up to 150° C., not more than 3%
    b. Up to 200° C., not more than 10%
    c. Up to 235° C., not more than 25%
8. N. P. V. & L. A. #220:
    a. 5% at 162° C.
    b. 95% at 270° C.
9. S. P. S. S. O.:
    a. 5% at 137° C.
    b. 95% at 257° C.
10. N. S. S. O.:
    a. I. B. P., 150° C.
    b. 5% at 205° C.
    c. 95% at 292° C.
11. Carbolineum, 270° C. I. B. P.

The abbreviations used in the foregoing are explained as follows: S. P. S. S. O., Southern Pine Shingle Stain Oil; N. S. S. O., Neville Shingle Stain Oil; A. W. P. A., American Wood Preservers Association.

Among other things, the present process is adapted to provide treatment of tars of aromatic content, or fractions thereof, with hydrogen and hydrogen sulfide in the presence of a sulfide catalyst as heretofore described, whereby to provide a newly induced low boiling point which comprises if desired the initial boiling point of the solvent, and may be controllably held at substantially any point, as for instance serving as substitutes for any of the following, or others:

*Solvents*

| Identification: | Initial point, °C. |
|---|---|
| Benzol | 78 |
| Toluol | 100 |
| High flash naphtha | 150 |
| High boiling crudes | 175 |
| Heavy naphtha | 150 |
| Plasticizers | 160 and above | or, solvents of special nature may be produced, as for instance, having lower boiling points than above listed.

The initial or low boiling point of the beneficiated material is determined by intensity of process controls. Controls of lesser intensity producing higher initial boiling points and controls of greater intensity producing lower initial boiling points.

*Example 2.*—A coal tar, specific gravity 1.1641 and a coke residue in excess of 5% is passed through a high pressure reaction chamber while simultaneously flowing hydrogen and hydrogen sulfide therewith while contacting a cobalt sulfide catalyst at a temperature of 400° C. and 300 atmospheres. The gas flow is 12,000 cubic feet per barrel feed stock, time of contact substantially one hour and the hydrogen sulfide partial pressure one and one half atmospheres.

The beneficiated material will be found upon inspection to have reduced coke residue, specific gravity and viscosity; further inspection will disclose that no substantial percentage of liquid chain structures are induced and that the controls of the process induced no substantial percentage of carbonaceous increment. The beneficiated material is distilled to an upper limit of 300° C. and the distillate subjected to the action of hydrogen while flowing through a reactor at 400° C. and 200 atmospheres pressure. The gas flow is 6,000 cubic feet per barrel feed and the time element so controlled as to induce solvent and toxic properties; the beneficiated material will be further characterized by a final increment of low boiling fractions in excess of fractional increment in the higher boiling range. The overall beneficiated material may be used as such or distilled to recover the solvent as a distillate and the remainder as a wood preservative, or, the wood preservative and the solvent both may be recovered as distillates, with the residue therefrom being recycled or serving as an article of commerce, as for instance, a binder or plasticizer valuable because of its enhanced value.

The term "pitch" as used herein includes the higher boiling fractions of tars, in other words tar from which low boiling ends have been stripped, such low boiling ends being suitable for use per se as creosote, other wood preservatives, or solvent. For instance, the final residue resulting from evaporating tar to dryness and then stripping wood preservatives from the distillate is a very suitable pitch for use as a starting material of the present process.

*Example 3.*—A coal tar pitch, specific gravity 1.23 and boiling substantially 15% at 355° C. is subjected to the action of hydrogen and hydrogen sulfide while contacting a sulfide catalyst at 385° C. and 200 atmospheres pressure for a period of one hour. An identical cycle of hydrogen action is repeated upon the once beneficiated pitch. The beneficiated pitch is then distilled to an upper limit of 335° C. and the distillate subjected to the action of hydrogen at a temperature of 440° C. and 225 atmospheres for such a length of time as to induce solvent and toxic properties; the beneficiated material is distilled to an upper limit of 200° C. to provide the distillate as a solvent of the present invention and the remainder thereof as a material having enhanced toxic properties.

Some of the starting materials may have sufficient sulphur or sulphur-bearing material contained therein to provide sufficient hydrogen sulfide for the requirements of the process; in the event the starting materials do not contain sufficient sulphur or sulphur-bearing material, sulphur in any form, as for instance, elemental sulphur, or otherwise may be added. The induction of solvency and toxicity of the present invention are not maintained without substantial reduction unless there is maintained a hydrogen sulfide atmosphere sufficient to maintain aforesaid sulfide catalyst in at least partial sulfide form. In the absence of said hydrogen sulfide atmosphere the induced solvency and toxicity of the present invention become decreasing quantities. At times the maintenance of a hydrogen sulfide partial pressure of one atmosphere is sufficient, however, higher or lower values may be used.

The point of stripping the beneficiating material characterized by reduction of coke residue, specific gravity and viscosity, is, among other things, dependent upon the end point of the wood preservative desired.

An especially attractive mode of practicing the present invention is to provide the cut between the solvent and wood preservative at around 270° C. The wood preservative of the indicated initial boiling point will serve as a substitute for carbolineum wood preserving oils; and the higher boiling portion of the solvent fraction serving as a substitute for certain plasticizing oils.

The residue from any of the distillation steps may be recycled for conversion to products of the present invention. It has been found that the step-wise action of hydrogen in conjunction with other provisions has the effect of causing the coke residue to substantially disappear.

All catalysts effective in the presense of hydrogen are usable in conjunction with aforesaid sulfide catalysts; especially effective are those based on metals of the sixth and eighth periodic groups, as for instance, sulfides and/or oxides, separately or in admixture; in any shape or form, as for instance, comminuted, pellets, extruded lengths, supported on carriers, as for instance, on gels or the like. Other materials may be added, as for instance, splitting agents. Effective in a special manner are the oxides and/or sulfides of chromium, vanadium, tungsten, cobalt, tin, molybdenum, or the like.

Hydrogen may be supplied as such or in the form of hydrogen-containing gas. Materials capable of supplying or generating hydrogen may be used.

Starting materials are tars of aromatic content or fractions thereof, said tars being derived from coal, wood petroleum, gas or gases. Among such tars are included coke oven tar, gas house tar, low temperature tar, water gas tar, pine tar, wood tar, "synthetic coal tar" of petroleum derivation including gas and/or gases. Aromatic tars or fractions thereof at least once refined by hydrogen or other means are especially effective starting materials.

When using starting materials containing high molecular complexes, said complexes may be depolymerized or reduced, including in size, in stepwise manner until, if desired, substantially the entirety thereof remaining liquid appear in the solvents and wood preservatives of the present process.

As is well known, the action of hydrogen proceeds at lowered pressures, and the present process may be carried on at a pressure as low as 50 atmospheres however, pressures of in the order of 200 atmospheres and thereabove, as for instance, 300 to 500 atmospheres, are preferred. The action of hydrogen in accordance with the present process proceeds at lowered temperatures, however, temperatures in excess of 300° C. are preferred, the upper limit being at least lower than that temperature which causes inordinate deposition of carbonaceous increment, as for instance, coking.

The time element, because of the possible varied characteristics of the starting or intermediate starting materials, cannot be stated arbitrarily. In the first cycle of hydrogen action the time element necessary for reduction of coke residue, specific gravity and viscosity is generally in the order of one hour. However, using certain feed stocks periods of shorter than one hour prove effective. Longer periods may be used. In the second cycle of hydrogen action, the period may be as short as one minute, at times more, as for instance, several minutes; broadly considered, the time element in the second cycle of hydrogen action is that period necessary for the joint induction of solvent and toxic characteristics. Generally, the time element in the second cycle is less than the time element in the first cycle.

The first action of hydrogen, when using certain starting feeds is characterized by a condensation of the boiling range toward the low ends.

Gas flows of in the order of 10,000–20,000 cubic feet per barrel feed stock in the first cycle of hydrogen action have proven satisfactory, however, higher or lower flows may be used; in the second cycle of hydrogen action gas flows of from 6,000–8,000 cubic feet per barrel feed stock have proven satisfactory, however, higher or lower flows may be used.

By the term "beneficiated" as used herein and in the appended claim, is meant the starting material subjected to the action of hydrogen and hydrogen-sulfide while contacting a sulfide catalyst in accordance with the present process.

The term coal tar in this country is understood to mean tar produced by high temperature carbonization of coal, as for example, high temperature coke oven tar and gas house tar.

Starting materials of the present process also include tars of aromatic content from which low boiling fractions have been removed, as for instance, tars from which solvent oils have been removed. Viewed broadly, the starting materials of the present process are tars of aromatic content, fractions of said tar more viscous than the starting material due to removal of low boiling fractions from the starting material, high boiling fractions and pitches.

In the disclosures herein made the removing of low boiling fractions by gas movement or pressure release is considered the equivalent of distillation.

A convenient method for determining enhanced solvency is by the evaluation of the well-known Kauri-butanol number. A convenient method for the evaluation of added toxicity is described under the caption "Method of conducting the tests," page 2, Technical Bulletin No. 346, March, 1933, U. S. Department of Agriculture.

Minor changes may be made in the details of the foregoing, without departing from the spirit of the invention.

I claim:

In the joint production of solvents and wood preservatives, the process which comprises: subjecting a mixture of high temperature coal tar fractions to the action of a relatively high flow of hydrogen and a flow of hydrogen sulfide whilst contacting a sulfide catalyst with time, temperature and pressure so controlled as to reduce coke residue, specific gravity and viscosity; stripping the beneficiated material at a temperature not substantially in excess of 370° C. and subjecting at least a portion of the stripped low boiling materials in a stream to the action of a relatively low flow of hydrogen not in excess of about 6000 cubic feet per barrel material treated at a temperature in excess of 300° C., a pressure in excess of about 50 atmospheres and for such a length of time as to provide fractional increment of low boiling fractions in excess of fractional increment in the higher boiling range; and dividing the entirety of the treated material into a relatively low boiling solvent and a relatively high boiling oil of the wood preserving type, said oil last named boiling in accordance with specifications accepted in the trade for a tar derived wood preservative.

JACQUELIN E. HARVEY, Jr.